Nov. 4, 1958 — H. O. DARBY — 2,859,065
WHEEL WEIGHTS FOR TRACTORS
Filed April 29, 1957 — 2 Sheets-Sheet 1

HERMOND O. DARBY
INVENTOR

BY John A. Mawhinney
ATTORNEY

HERMOND O. DARBY
INVENTOR

United States Patent Office 2,859,065
Patented Nov. 4, 1958

2,859,065

WHEEL WEIGHTS FOR TRACTORS

Hermond O. Darby, Pampa, Tex.

Application April 29, 1957, Serial No. 655,581

2 Claims. (Cl. 301—41)

This invention relates to detachable wheel weights for the traction wheels of farm tractors. More particularly, this invention relates to an improved weight set for the traction wheels of farm tractors, which weight set due to it being composed of separate units is easily attachable to tractor wheels.

It has long been the practice to add weights to farm tractor wheels. These weights are usually made in the form of heavy rings of cast iron which often weigh from 100 to 300 pounds or more. It must be realized that such weights are extremely difficult to attach to tractor wheels since they must be supported in an elevated position while they are bolted in place; such installation requires excessive manual effort.

Another difficulty which has been discovered when prior art weights are employed is that the weights are often mounted in such a manner that it is impossible to adjust the width of the tractor wheels without first detaching the weights.

It is therefore an important object of this invention to provide novel wheel weights for the drive wheels of tractors.

It is a further object of this invention to provide improved, multi-piece wheel weights for the traction wheels of farm tractors and the like wherein each weight piece may be conveniently and easily attached to, or detached from, the tractor wheel.

It is still another object of the invention to provide novel wheel weights for the drive wheels of tractors which are self-centering.

With the foregoing and other objects in view, the invention will be more fully described hereinafter, and will be more particularly pointed out in the claim appended hereto.

Referring to the drawings.

In the drawings, wherein like symbols refer to like or corresponding parts throughout the several views.

Figure 1:
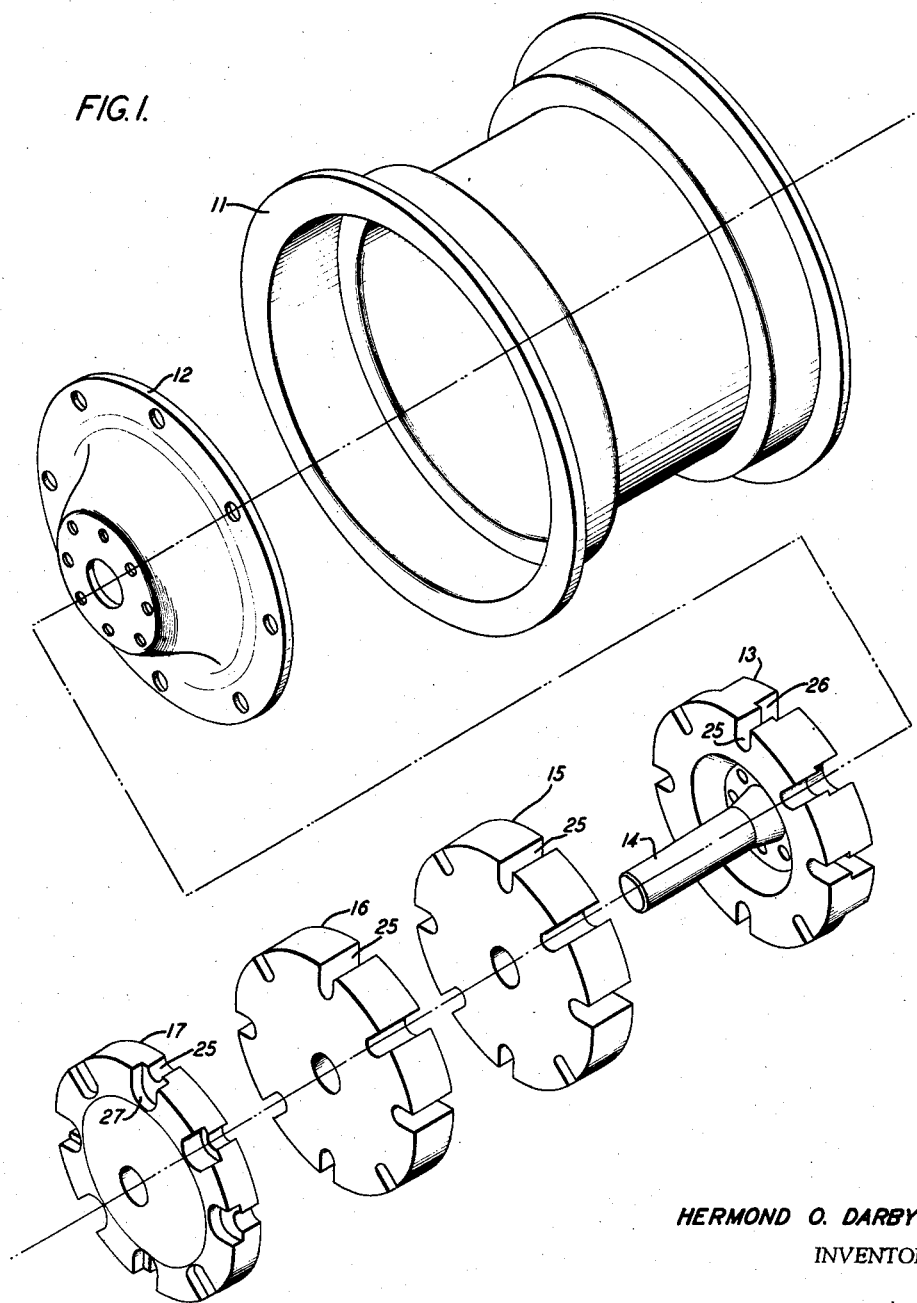
Figure 1 is an exploded view of the component parts showing the weights, wheel and tractor tire rim.

In Figure 1, the numeral 11 refers, generally, to a tractor rear wheel rim, 12 is the tractor wheel. Numeral 13 refers to a weight hub having a supporting protrusion 14. Numerals 15 and 16 refer to separate weights, while 17 is the final or cap weight.

Figure 2:
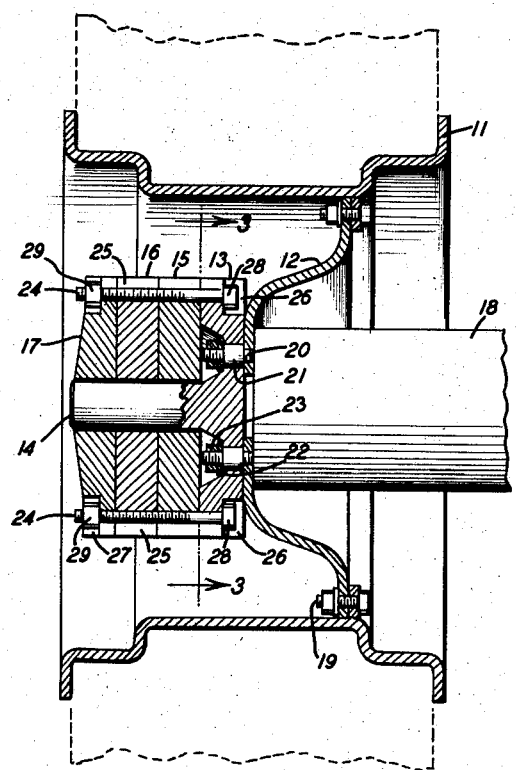
Figure 2 is a cross sectional view showing the weights in position on the tractor wheel.

In Figure 2, the weights are assembled and mounted on the tractor wheel. The tractor wheel is mounted on the hub of the axis 18 while the rim is mounted on the wheel by means of bolts 19. The wheel is mounted on the hub by means of eight small holes near the center, in the usual manner, by first slipping the wheel over stud bolts 20. Then oversized studs 21, which are threaded both internally and externally on opposite ends, are used as nuts to replace the usual nuts in attaching the wheel.

Weight hub 13 is slipped over the second stud 21 so that one side of the section is appurtenant the tractor wheel and the wheel and weight hub are in coaxial alignment. A washer 22 and nut 23 are placed on stud 21 and tightened, permanently affixing weight hub 13. Weight hub 13 may be considered a weight although it can be seen from the drawings that its contribution to the total weight involved is not as great as the sections mounted subsequently. Weights 15 and 16 slip over protrusion 14 of weight hub 13. Weight 17 which also slips over the protrusion 14 caps the set up.

The weights are affixed into their positions by inserting bolts 24 into slots 25 provided along the circumference of the sections. Before the bolts can be inserted the slots of weights 15, 16 and 17 must be aligned with the slots of weight hub 13 so that the bolts can be properly inserted. Weight hub 13 and weight 17 are provided with slots having enlargements 26 and 27 in order to receive the heads 28 and the nuts 29 of the bolts. Bolts 24 are consequently mounted flush with the weights.

Figure 3:
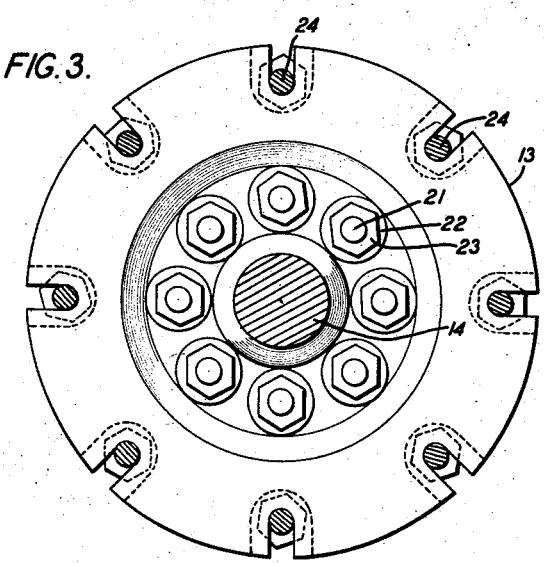
Figure 3 is a sectional view taken along the plane 3—3 of Figure 2.

Figure 3 is a sectional view taken along the plane 3—3 of Figure 2. Actually, it apepars as a front view of the weight hub 13. It can be seen that all eight of the usual studs provided in the axis of tractors are employed in securing weight hub 13 to the wheel, thus providing for desirable rigidity.

Figure 4:
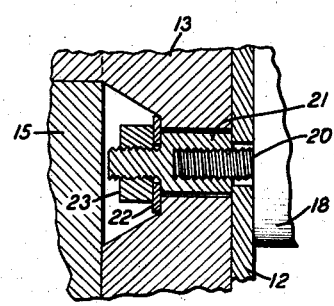
Figure 4 is an enlarged cross sectional view showing the arrangement for mounting the weight set to the wheel.

Figure 4 is an enlarged view, as compared to the other views, illustrating the arrangement for affixing the weight hub to the wheel. Stud 21, which is internally and externally threaded, is screwed on the usual stud 20 present on the tractor axis hub. One of the features of this invention is illustrated by Figure 4. When weight hub 13 is placed over studs 21 only a general centering of the weight hub takes place. The tightening of nut 23 presses washer 22 against the constricting wall 30 of the hole in weight hub 13 so that the weight hub will be centered properly when the nut is completely tightened.

The advantages of the present wheel weight will be readily apparent to those skilled in the art. For example, since the weight is made up of separate units, the wheel weight set may be more easily attached and detached. Another advantage is that weight hub 13 being of fairly light weight may be permanently affixed to the wheel without appreciably affecting the tractor wheel.

On occasion it may be desirable to add only one or two of the weights rather than all of them. It is entirely feasible, in utilizing the apparatus of this invention, that less than all the weights may be affixed without affecting the balance of the wheel and weight. In such a case the nuts on bolts 24 would have to be screwed further onto the bolt in order to compensate for the fewer number of weights. If convenient, smaller bolts may be employed under such circumstances.

A novel feature of this invention is that once weight hub 13 is affixed and centered it is a simple matter to mount the weights and to align the slots. The weights as they are added are slipped over protrusion 14 which supports the weights, it not being necessary to manually hold the weights in position until they are bolted in place. The process of aligning the slots is relatively easy since the supporting protrusion functions as an axis about which the weights may be revolved until they are in proper alignment.

The wheel weights by being mounted directly on the wheel provide the additional advantage of not contributing stress on the wheel bearings as is the case when weights are attached directly to the frame of the tractor.

The various component parts of the wheel weights may be constructed of the usual metals, such as iron. Economics may be achieved by having each of the sections made from unfinished cast iron. Since weight hub 13 is self-centering and the weights are constructed to align with weight hub 13, there is no need for employing expensive polished metals.

An advantage inherent in the wheel weights of this invention is the fact that the weight is made up of components that can be handled by a single individual and installation can be made in the field by one man.

An unusual feature and advantage of the present invention is the fact that the rim can be removed for tire replacement without the removal of the weight assembly.

An additional advantage is that the weight assembly can be installed without the removal of the tire or wheel.

Although I have disclosed herein the best form of the invention known to me at this time, I reserve the right to all such modifications and changes as may come within the scope of the following claims.

What is claimed is:

1. A detachable wheel weight assembly for use with a tractor having a wheel hub and a ring of bolts on said hub and a wheel assembly supported by said bolts, said weight assembly comprising a circular weight hub and means for attaching said weight hub through holes in the weight hub to said wheel hub bolts in coaxial alignment with said wheel, said weight hub having an outwardly extending center protrusion, said holes being of wider diameter at the side having the protrusion than at the other side whereby the weight hub is self centering as the nut, preceded by a washer the size of the small end of the tapered hole, is tightened, a plurality of circular weights adapted to fit over said protrusion and in coaxial alignment with said weight hub, and means to fixedly mount said weights to said weight hub.

2. A detachable wheel weight assembly for use with a tractor having a wheel hub and a ring of bolts on said hub and a wheel assembly supported by said bolts, said weight assembly comprising a circular weight hub and means for attaching said weight hub through holes in the weight hub to said wheel hub bolts in coaxial alignment with said wheel, said weight hub having an outwardly extending center protrusion, said holes being of wider diameter at the side having the protrusion than at the other side whereby the weight hub is self centering as the nut, preceded by a washer the size of the small end of the tapered hole, is tightened, and a plurality of circular weights adapted to fit over said protrusion and in coaxial alignment with said weight hub, said circular weights being fixedly mounted to said weight hub by means of bolts inserted in suitable slots along the circumference of the weights and weight hub.

References Cited in the file of this patent

UNITED STATES PATENTS

| | | |
|---|---|---|
| 1,487,257 | Mansfield | Mar. 18, 1924 |
| 1,532,962 | Turner | Apr. 7, 1925 |
| 2,150,107 | Shields | Mar. 7, 1939 |
| 2,635,012 | Rappaport | Apr. 14, 1953 |